United States Patent [19]

Vukson et al.

[11] Patent Number: 4,894,298
[45] Date of Patent: Jan. 16, 1990

[54] ALKALI AND HALOGEN RECHARGEABLE CELL WITH REACTANT RECOMBINATION

[75] Inventors: Stephen P. Vukson, Tipp City; David H. Fritts, Dayton; John F. Leonard; Kwang Y. Kim, both of Beavercreek, all of Ohio

[73] Assignee: The United States of America as represented by the Secretary of the Air Force, Washington, D.C.

[21] Appl. No.: 261,802

[22] Filed: Oct. 24, 1988

[51] Int. Cl.⁴ ............................................ H01M 10/39
[52] U.S. Cl. ...................................... 429/50; 429/101; 429/17; 429/19; 429/103; 429/104
[58] Field of Search ............... 429/101, 103, 104, 102, 429/13, 17, 19, 50

[56] References Cited

U.S. PATENT DOCUMENTS

| | | | |
|---|---|---|---|
| 3,542,602 | 11/1970 | Gabano | 136/155 |
| 3,567,515 | 3/1971 | Maricle et al. | 136/6 |
| 3,879,221 | 4/1975 | Farrington | 136/83 R |
| 3,879,222 | 4/1975 | Lord et al. | 136/83 R |
| 3,879,223 | 4/1975 | Farrington et al. | 136/83 R |
| 3,879,224 | 4/1975 | Farrington et al. | 136/83 R |
| 4,102,042 | 7/1978 | Weiner | 29/623.2 |
| 4,146,684 | 3/1979 | Fischer et al. | 429/104 |
| 4,184,013 | 1/1980 | Weddigen et al. | 429/104 |
| 4,221,848 | 9/1980 | Weddingen | 429/104 |
| 4,237,200 | 12/1980 | Weddingen | 429/102 |
| 4,352,866 | 10/1982 | Klinedinst et al. | 429/101 |
| 4,400,453 | 8/1983 | Blomgren et al. | 429/196 |
| 4,663,252 | 5/1987 | Chenebault et al. | 429/101 |
| 4,774,156 | 9/1988 | Bones et al. | 429/104 |

OTHER PUBLICATIONS

"Electrochemical Power Sources", M. Barak et al., Peter Peregrinus Ltd., IEE Energy Series 1, 1980, Burgess Hill, Sussex, England.

*Primary Examiner*—Donald L. Walton
*Attorney, Agent, or Firm*—Gerald B. Hollins; Donald J. Singer

[57] ABSTRACT

An alkali metal plus halide electrical battery cell of, for example, the sodium and sulfuryl chloride type is disclosed. The disclosed cell provides accommodation for cell chemical reaction products that otherwise preclude achievement of secondary battery action or rechargeable nature in such cells and provides two physical accommodation changes, a reaction space and a reaction space temperature, in the cell arrangement to enable repeated charge and discharge cycling of the cell. The disclosed cell is shown to be embodied in a laboratory type structure and is described with net reaction or end result equations of a combined chemical and physical nature.

25 Claims, 2 Drawing Sheets

ALKALI AND HALOGEN RECHARGEABLE CELL WITH REACTANT RECOMBINATION

RIGHTS OF THE GOVERNMENT

The invention described herein may be manufactured and used by or for the Government of the United States for all governmental purposes without the payment of any royalty.

CROSS REFERENCE TO RELATED APPLICATIONS

The following patent applications are somewhat related and have the same file date. Some of these applications also include one or more of the present application inventors as a named inventor thereof and are also commonly assigned to the Government of the United States represented by the Secretary of the Air Force. Each of these applications is also hereby incorporated by reference herein. The present application (designated by an *) is included in this list for clarity and completeness of the record.

| PTO Serial Number | Title |
| --- | --- |
| 07/261,804 | Electrical Battery Cell Wicking Structure and Method |
| 07/261,803 | Rigidized Porous Material and Method |
| 07/261,802 | (*) Alkali and Halogen Rechargeable Cell with Reactant Recombination |
| 07/261,807 | A Method of Manufacturing Heat Pipe Wicks and Arteries |
| 07/261,809 | A Method of Manufacturing Heat Pipe Wicks |
| 07/261,808 | Unidirectional Heat Pipe and Wick |

BACKGROUND OF THE INVENTION

This invention relates to the field of secondary or rechargeable electrical battery cells of the alkali metal and halogen reactants type, such cells being commonly operated at elevated cell temperatures.

Electrical battery cell capabilities are a limiting consideration in a number of modern day technical arts. In the transportation industry, for example, the frequently discussed electrically powered automobile has failed to become a practical reality principally because of propulsion energy storing or battery limitations. From another perspective of this difficulty, the commonly used lead acid battery cell is frequently credited with an energy storage density in the range of 10 to 15 watt-hours per pound, a density which is found to be inadequate for satisfactory use in even runabout or local delivery battery powered automobile service.

In the fields of aircraft and spacecraft design, energy storage limitations directly affect the payload and propulsion requirements of flight vehicles and therefore are of intense concern. The first space satellite, for example, used nickel/cadmium batteries that displayed an energy density capability of one to two watt-hours per pound of battery weight. In the ensuing twenty years of space research, the energy density of such nickel/cadmium and related cells has increased to densities in the range of six to twelve watt-hours per pound of battery weight. At this point of battery cell development, the nickel/hydrogen battery cell became available and is currently the state of the art cell for spacecraft applications. The nickel/hydrogen cell achieves energy densities in the range of 15 to 20 watt-hours per pound. Present expectations are, however, that batteries employing an alkali metal and halogen or other reactant will provide the next generation of battery technology for spacecraft usage. The presently investigated sodium and sulfur cell embodiment of this technology is, for example, capable of providing energy densities approaching 50 watt-hours per pound of battery weight.

The alkali metal and halide battery cell as is principally described herein is capable of providing even greater energy densities, densities in the range of 100 watt-hours per pound when embodied in the form of a sodium and sulfuryl chloride reactant cell. Heretofore, however, there have been difficulties in achieving secondary cell or rechargeable cell characteristics in the alkali metal and halide reactant battery cell and especially in achieving this secondary cell capability in the sodium and sulfuryl chloride cell.

The sodium and sulfuryl chloride version of the alkali metal metal halide cell has received considerable attention in the patent art as is illustrated, for example, by the patents of G. E. Blomgren et al, U.S. Pat. No. 4,400,453 and several patents to G. C. Farrington and P. C. Lord at General Electric Company, including U.S. Pat. No. 3,879,221; U.S. Pat. No. 3,879,222; U.S. Pat. No. 3,879,223 and U.S. Pat. No. 3,879,224.

Notwithstanding this inventive attention, the prior art has failed to provide a satisfactory secondary or rechargeable alkali metal and halide or sodium and sulfuryl chloride battery cell.

SUMMARY OF THE INVENTION

The present invention provides a high energy density alkali metal and halide reactants electrical battery cell of the secondary or rechargeable variety by incorporating certain additions or modifications to the physical configuration of such cells. These improvements preclude the progression of reactant materials into a lock-up or trapped or unavailable for reaction condition within the cell structure.

It is an object of the invention to provide an improved operating arrangement for a sodium and sulfuryl chloride electrical battery cell.

It is another object of the invention to provide an improved alkali metal and halide reactant electrical battery cell which includes secondary cell or recharge capability.

It is another object of the invention to provide a rechargeable sodium and sulfuryl chloride electrical battery cell.

It is another object of the invention to provide an electrical battery cell in which volatile or gaseous reaction products are recombined into an original reactant.

It is another object of the invention to provide for the regeneration of reactant materials in a sodium and sulfuryl chloride electrical battery cell.

It is another object of the invention to provide for the combination of volatile reaction products which occur during different operating cycle events of a battery cell.

It is another object of the invention to provide a battery cell physical arrangement that is conducive to volatile reaction product recombination.

It is another object of the invention to provide a high energy density rechargeable electrical battery cell.

Additional objects and features of the invention will be understood from the following description and the accompanying drawings.

These and other objects of the invention are achieved by a rechargeable alkali and halide electrical battery cell comprising the combination of an enclosed vessel; an alkali metal inclusive anodic reactant material received in said vessel; a halide inclusive liquid catholyte material received in said vessel; an alkali metal ion transporting separation member disposed between said materials in said vessel; reaction chamber means in communication with said vessel for receiving volatile reaction products incident to the cell discharge reaction of said reactant and catholyte materials and to the cell recharge regeneration thereof; means communicating between said reaction chamber and said ion transporting member region of said vessel for returning regenerated reactant materials to said vessel.

DETAILED DESCRIPTION OF THE DRAWINGS

Figure 1:
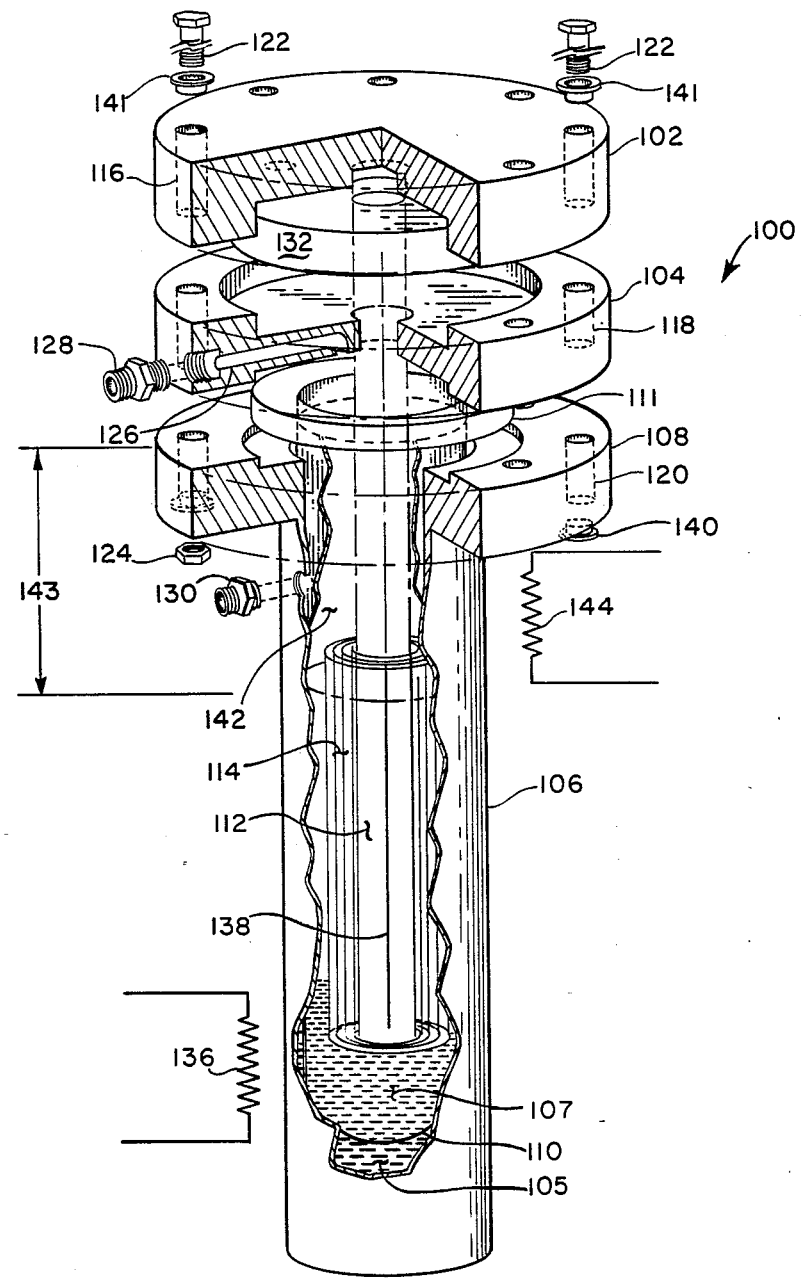
FIG. 1 shows the arrangement of a battery cell in accordance with the present invention.

FIG. 1 in the drawings shows a laboratory arrangement of an electrical battery cell that is made in accordance with the present invention. The FIG. 1 battery cell 100 includes a vessel member 106 in which are received a pair of liquifiable reactant materials 105 and 107 that are separated by a solid electrolyte member 110. The reactant materials 105 and 107 are held in pressure tight confinement by a pair of capping members 102 and 104 that mate with a flange 108 of the vessel member 106. The FIG. 1 cell structure also includes a center electrode member 112 to which is attached a carbon impregnated metal screen member 114. This screen attachment is accomplished by way of an electrode split or division 138 and clamping of the metal screen 114 between mating halves of the center electrode member 112.

Also included in the FIG. 1 electrical battery cell is a pressure sealing member 132 by which the capping members 102 and 104 are retained in a gas type relationship during operation of the cell 100. Similarly functioning sealing washers or the like are preferably disposed on upper and lower sides of the flange member 111 in order to achieve a gas tight seal between this electrolyte flange and the flange 108 and cap 104. These sealing washers are omitted from the FIG. 1 drawing in the interest of drawing clarity. Maintenance of this gas tight relationship is also accomplished by the threaded fasteners and mating nuts therefor indicated at 122 and 124. The fasteners 122 and nut 124 mate with the cap 102 and the flange 108 by way of the electrically insulating washer members 140 and 141. The insulating washer members 140 and 141 are provided in view of the capping member 102 and the vessel member 106 being the two electrical terminals of the illustrated battery cell arrangement. Clearance holes for the threaded fastener member 122 are indicated at 116, 118 and 120 in the capping members and flange structure respectively.

Also shown in the FIG. 1 cell is an access path 126 which includes a terminal fitting member 128 for providing sealed battery access to the reactant 107 disposed internally of the electrolyte member 110. A similar fitting member 130 provides access to the reactant material 105 which lies intermediate the electrolyte member 110 and the vessel member 106.

Additionally shown in the FIG. 1 battery cell are a pair of electrical heater elements 136 and 144 which are thermally coupled to the lower and upper regions of the battery cell 100 in an arrangement providing for differing operating temperatures in these two regions. The region of the cell 100 that is located above the reactant material 105 and metal screen 114 and in thermal connection with the upper electrical heater element 144 is indicated at 142 in FIG. 1.

The laboratory electrical battery cell structure 100 in FIG. 1 may be used to embody a number of differing types of electrochemical battery cells. In the present instance, the cell embodied in the FIG. 1 apparatus is of the alkali metal and halide reactant type wherein the alkali metal which is presumed to be liquifiable at some elevated temperature comprises the reactant material 105 and the halogen reactant which is also presumed to be in liquified or liquifiable form comprises the reactant material 107.

In a more specific arrangement of this battery cell, the alkali metal reactant 105 is embodied in the form of metallic sodium and the halide reactant material 107 is embodied in the form of sulfuryl chloride, $SO_2Cl_2$, which includes additional salts in the form of sodium tetrachloroaluminate, $NaAlCl_4$, and aluminum chloride, $AlCl_3$, the latter salts being preferably of one molar and one-half molar concentrations respectively. With these reactant materials, a battery cell of the FIG. 1 type may be operated at some elevated temperature—a temperature in the range of 275° C. being preferred for the lower and reactant containing regions of the FIG. 1 cell in the present instance. Maintenance of this temperature is provided by the lower region electrical heater element 136 in the FIG. 1 cell.

When thusly arranged, the FIG. 1 electrical battery cell is found to provide an open circuit terminal voltage that is in the range of 3.9 to 4.2 volts, the latter higher voltage being provided in the presence of some breakdown of the sulfuryl chloride reactant into sulfur dioxide and chlorine components. The current density and other detailed electrical properties of a FIG. 1 type cell when operated with the sodium and sulfuryl chloride reactants is significantly depended upon the structure and arrangement of the metallic screen 114 and the form and processing of the finely divided carbon material which is impressed on this screen member. The sulfuryl chloride is a liquid reactant material, and of significantly lower electrical conductivity than is the metallic sodium reactant material; for this and other reasons, the large surface area provided by the screen retained carbon particles is somewhat determinative of the performance of the cell 100, particularly at higher electrical current levels. The electrical resistance property of the FIG. 1 cell 100 is also dependent upon the degree of achieved wetting between the sodium reactant material 105 and the solid electrolyte member 110 as has been described in the art and as is described and improved upon in our above referred-to co-pending patent application. This co-pending application generally involves the disposal of a finely divided powder metal wick on the electrolyte member 110 in order to achieve improved melting action. The contents of our above identified and referred to co-pending patent application are hereby incorporated by reference herein.

Figure 2:
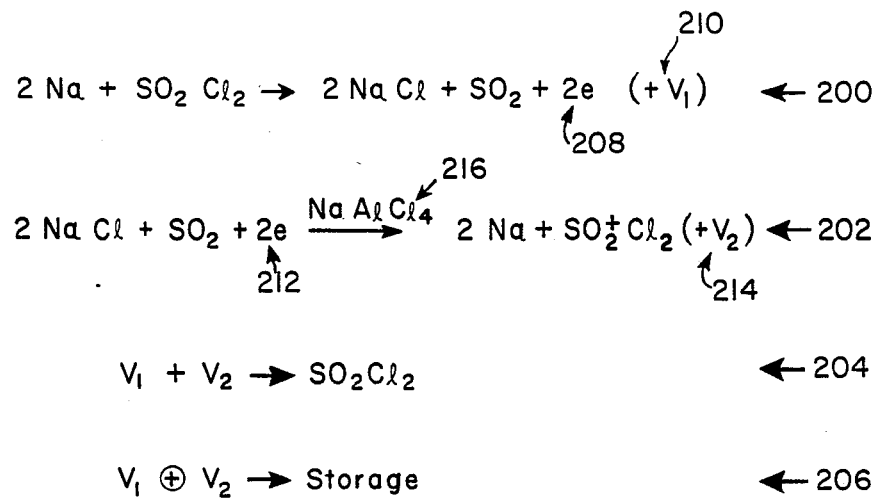
FIG. 2 shows equations for the chemical and physical reactions involved in a battery cell according to the invention.

FIG. 2 in the drawings shows the net chemical reaction and physical reaction equations that are descriptive of the FIG. 1 electrical battery cell—when the cell is embodied as a sodium and sulfuryl chloride cell. In the first of the FIG. 2 equations, equation 200, the generation of electrical energy, that is, the discharging of the FIG. 1 cell, is described. In the discharge equation 200, sodium and sulfuryl chloride are shown to react to produce sodium chloride and sulfur dioxide reaction products. The latter of these products is a gaseous material. The sodium and sulfuryl chloride reaction also produces the electrons comprising a flow of battery cell electrical current as is indicated at 208.

The re-charge equation for the sodium and sulfuryl chloride FIG. 1 cell, is indicated at 202 in FIG. 2. The re-charge equation includes the addition of electric current flow electrons, as indicated at 212, to the sodium chloride and sulfur dioxide reactants formed in equation 200 to provide again the sodium and sulfuryl chloride starting reactants of equation 200. These, again generated original reactants are shown on the right hand side of equation 202. As is indicated at 216 in FIG. 2, the re-charge reaction equation for the sodium and sulfuryl chloride cell, is believed to involve an intermediate sodium aluminum tetrachloride product. In this regard, it has been stated without emphasis earlier herein that the FIG. 2 equations are "net reaction" equations which describe the end products of the involved reactions. It is believed, however, that these net reactions actually occur by way of forming intermediate reaction products which are not shown in FIG. 2 and which are not fully understood—even for the sodium and sulfuryl chloride cell. By way of spectrophotometer analysis, it is believed these intermediate reaction products can be eventually identified.

Although the sodium and sulfuryl chloride reactants electrical battery cell has been used heretofore in the electrochemical art as is indicated in the above background of the invention material, the prior battery cell uses of these reactants appears limited to primary or non rechargeable cell examples. Indeed, work with such cells by the present inventors indicates the occurrence of a reactant lockup mechanism tending to prevent the employment of such cells in a secondary or rechargeable cell operating mode. Although the exact nature of this reactant lockup mechanism is not fully understood, it is found that the incorporation of certain additional concepts into a cell of this nature is effective to remove the lockup mechanism and enable bi-directional or secondary cell or charge and discharge operation of a cell using such reactant pairs. Other reactant pairs in the alkali metal and halogen and halide reactant categories, for example, are believed to also be amenable to this improvement.

A significant aspect of the reactant lockup mechanism, which precludes secondary cell action in the sodium and sulfuryl chloride cell, is believed to involve a generation of volatile or gaseous reaction products in the charge and discharge chemical reactions of the cell. According to this concept, the reactions described by the equations 200 and 202 in FIG. 2 of the drawings therefore include the generation of secondary cell inhibiting volatile or gaseous reactants that become trapped in non-reacting form in the structure of the cell. One unusual aspect of these gaseous or volatile product formations involve the believed formation of one volatile product during the cell discharging chemical reaction, that is, the reaction of equation 200 in FIG. 2 and the formation of another volatile product during the cell charging chemical reaction, the reaction described by equation 202 in FIG. 2.

Another aspect of this reactant lockup mechanism involves the geometry or physical arrangement of the battery cell structure and especially the tendency of most previous cell arrangements to provide for both uniform cell operating temperatures and for maximum utilization of the available cell structure surface areas and volume. Both of these practices, it is now believed, tend to encourage the reactant lockup mechanism and thereby interrupt the free exchange of reactant products that are necessary for a practical and reasonable life expectancy secondary battery cell. The above identified patents of Farrington and Lord illustrate cell structures of this type wherein maximum utilization of the available cell area and volume is accomplished. The drawings of these patents, which are all similar in appearance, describe a sealed cell arrangement which is described as a primary or non rechargeable cell and which fully utilize the available cell volume for principal reactant materials.

The presence of volatile reaction products in the reactions described by the equation 200 and/or 202 is indicated symbolically at 210 and 214 in FIG. 2. Although the exact nature of these volatile products is not fully understood, a major component of the volatile product $V_1$ indicated at 210 is believed to be the sulfur dioxide gas formed during the reaction of equation 200 and indicated on the right hand side of the equation 200. In a somewhat similar manner, the volatile product involved in the equation 202 is not fully understood but is believed to include gaseous chlorine that is liberated in the course of the charging reaction of equation 202.

This differential time liberation of the volatile products $V_1$ and $V_2$ indicated at 210 and 214 in FIG. 2, of course, implies that prevention of the reactant lockup phenomenon and assurance that the reactions of equations 200 and 202 can continue indefinitely requires the presence of some reactant storage capability in or in communication with the battery cell structure. Prevention of reactant lockup also requires the presence of conditions which encourage the recombination of volatile reaction products and a return of the volatile product recombination product to the supply of major reactants for the cell. The recombination of the reactants $V_1$ and $V_2$ in equations 200 and 202 into one of the principal reactants of the sodium and sulfuryl chloride cell is indicated in the equation 204 in FIG. 2—with the further indication in equation 204 that the believed product of this recombination reaction is, in fact, the sulfuryl chloride principal reactant.

In view of the different times of generating the volatile products 210 and 214 in the battery cell of FIG. 1 and the anticipated eventual recombining of these products as is indicated in equation 204 it follows that at any given instant in the operating cycle of a battery cell of this type there can be present an excess amount of either of the volatile products $V_1$ or $V_2$ depending upon whether the battery history has included a greater amount of charging or discharging equation action.

The fact that one or the other of the volatile products 210 and 214 in the equations 200 and 202 is to be expected in excess over the amount which will combine with the other volatile product in any given instant of the FIG. 1 battery cell operating cycle and that this excess amount of one volatile product is desirably stored in communication with the battery cell reactant materials is indicated in the equation 206 of FIG. 2. In equation 206, the symbol between the $V_1$ and $V_2$ terms is the "exclusive OR" symbol which is commonly used in Boolean Algebra and in the design of digital computer logic arrays. In its normal setting, the "exclusive OR" function indicates the presence of one but not both inputs to a logic gate will provide a signal output from the logic gate. The parallel between this normal use of the "exclusive OR" symbol and the conditions described for equation 206 in FIG. 2 is believed, therefore, to be apparent. As indicated by equation 206, therefore, one or the other of the volatile reactants is to be present in excess and is to be stored either physically within or within communication of the electrical battery cell of FIG. 1.

Both the storage of volatile products 210 and 214 and the provision of battery cell conditions tending to encourage the recombination of these volatile products into a primary reactant material appear to be concepts that have not been considered in cells such as the above identified Farrington and Lord cells.

Storage of a volatile or gaseous reactant in a cell structure such as is shown in FIG. 1 may, of course, involve adsorption, absorption, gas dissolved in or in solution in a liquid and other physical and chemical phenomenon as are known in the chemical and gas arts. Notwithstanding these possible mechanisms, however, it is found that the ability of a FIG. 1 type cell to act as a secondary or rechargable cell is significantly enhanced by the provision of at least one and preferably two recombination reaction recognizing alterations of the usual cell structure.

One of these alterations involves the upper region space of the FIG. 1 cell structure, the space that is illustrated at 142 and dimensioned at 143 in FIG. 1. The other of these alterations involve the operation of this upper region space 142 at a temperature that is different from the temperature of the principal reactant materials located in the lower portion of FIG. 1 cell. Provisions for this different operating temperature of the cell upper region is indicated in FIG. 1 by the additional heater element 144 which is thermally coupled to the structure surrounding the upper region 142 of the FIG. 1 cell. In reality, this electric heater element should be regarded as a symbolic representation of the desired cell arrangement since, in fact, the upper region 142 is found to be desirably operated at some temperature different than that of the lower regions of the FIG. 1 cell. Depending therefore on the employed cell structure and the thermal energy flow patterns attending the cell structure, the upper region electric heater 144 may be desirably arranged as a cooling device such as a cooling liquid flow, a Peltier effect semiconductor junction cooling device or other cooling arrangements known in the art. The actual addition of thermal energy to the upper region of the FIG. 1 cell as is indicated by the heater element 144 may, in fact, be desired in some instances as where heat losses to the surrounding environment of the cell are large or in other operating conditions that may be envisioned.

The upper region space indicated at 142 in FIG. 1 has been found to desirably comprise about 25% of the internal volume of the solid electrolyte member 110. This proportion is believed to be non-critical in nature but obviously involves tradeoff considerations between assuring the desired reactant recombination on one hand and avoiding unnecessary cell bulk on the other hand. Although as indicated above, the exact nature of the volatile products which utilize the upper region 142 and the exact mechanism in which these products use this region is not fully understood, it is believed that the volume of this region provides both storage and a recombination encouraging zone for these volatile products.

It is, of course, possible that the function of the upper region 142, whatever its exact nature, could be disposed in physical separation from the battery cell 100 through the provision of communication paths between the cell structure and a remotely located recombination chamber or storage chamber. Such communication paths might, for example, include a gaseous communication path and a liquid communication path or possibly a single communication path capable of conveying gaseous materials in one direction and liquid reactant material in the other direction. The term "plenum chamber" is used herein to refer generically to the above mentioned recombination and/or storage chamber regardless of its remote or local disposition.

When embodied as a sodium and sulfuryl chloride reactant cell, the FIG. 1 cell has been found to have desirable characteristics with the lower cell region, the region of primary reactant presence, operating at 275° C. and with the upper cell region, the region 142 in FIG. 1 operated in the range of 120° C. Clearly, a range of satisfactory operation temperatures for both of these cell regions is to be expected. Successful operation of the storage and/or recombination region 142 has been experienced in the temperature range of 25 to 150 degrees Centigrade for the sodium and sulfuryl chloride cell. Similarly operating temperatures between 100 and 275 degrees centigrade in the lower regions in the FIG. 1 cell have been found to provide satisfactory overall operation.

Satisfactory sodium and sulfuryl chloride cell operation has been found to occur with the use of metallic sodium of 99.9 percent purity as the reactant 105 in the FIG. 1 cell.

The center electrode 112 of the FIG. 1 cell may be fabricated of nickel material and the vessel member 106 fabricated of stainless steel material. The solid electrolyte member 110 may be fabricated of beta double prime alumina and may be obtained as an electrolyte shaped structure from a source such as Ceramatec Inc., of Salt Lake City, Utah. Additional characteristics of such alumina electrolytes are described in the publication "Electro-Chemical Power Sources, Primary and Secondary Batteries," published by Peter Peregriuns Ltd., on behalf of the British Institute of Electrical Engineers as part of the IEE Energy Series One and edited by M. Barak, and D. T. Swift-Hook at Burgess Hill, Sussex, England, copyrighted in the year of 1980. Chapter 6 of the Barak Publication is especially relevant to the present disclosure. The Barak publication is hereby incorporated by reference herein. Other electrolyte materials are, of course, desirable when different alkali metals are used in the FIG. 1 cell. One possible alternate electrolyte material which is not as satisfactory as the beta double prime alumina in a sodium cell is the Nasicon material that was developed for the National Aeronautics and Space Administration.

The metal screen 114 in the FIG. 1 cell may be made of nickel such as the nickel materials "200" or "270" available from International Nickel Ltd., (INCO). The elemental carbon used to impregnate the metal screen is as indicated above a significant factor in determining cell electrical characteristics and the preparation of such carbon materials is an art of some skill and undisclosed know how. A material that is found reasonably suitable for use in a cell of the described type is Shawiningan Black Carbon which is available from Gulf Canada Limited.

The sodium tetrachloroaluminate salt which is indicated above to be preferably included in the sulfuryl chloride embodiment of the reactant 107 and is moreover included in a concentration of one mole, serves principally to accomplish ionic conductivity in the described battery cell. Similarly, the aluminum chloride salt, which is indicated above to be present in one-half molar concentration in the sulfuryl chloride electrolyte serves to accomplish sodium chloride scavanging in the cell. The sulfuryl chloride reactant material is often referred to as a catholyte material, that is, a material providing both the cathode electrode action and electrolyte action in the described cell. The catholyte material additionally serves to keep the other reactant salts in solution, serves as a solvent and also as a chemical reactant.

Fabrication of the FIG. 1 battery cell as a sodium and sulfuryl chloride reactant cell generally involves the disposing of metallic sodium into the bottom of the vessel 106, heating this sodium into a liquid state, immersing the electrolyte member 110 in the molten sodium, sealing the capping members 102 and 104 into position and then introducing the sulfuryl chloride reactant material by way of the access path and fittings 126 and 128. Operating pressures in the sodium and sulfuryl chloride reactant cell have been found to be in the range of 200 pounds per square inch and to increase on discharge of the cell and decrease on charging of the cell in response to the formation of volatile products.

While the invention has been described principally with respect to a sodium and sulfuryl chloride battery cell, the concepts involved are believed applicable to a number of other cells in the alkali metal and halide reactant class. Additional possible variations will be apparent to persons skilled in the electrical battery and related arts.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. A rechargeable sodium and sulfuryl chloride secondary electrical battery cell comprising the combination of:
   an enclosed vessel;
   a first sodium inclusive anode reactant material disposed in a first receptacle portion of said vessel;
   a second sulfuryl chloride catholyte reactant material disposed in a second receptacle lower portion of said vessel;
   a sodium ion transporting solid electrolyte member disposed between said first and second receptacle portions and thereby between said reactant materials in said vessel;
   reactant recombination means including a vacated chamber disposed in the upper portion of said enclosed vessel for storing and recombining gaseous reaction products of the cell discharging reaction between said first and second reactant materials and the cell charging reaction regeneration of said reactant materials and for returning said recombined reaction products to said vessel second receptacle portion;
   means for controlling the temperature of said first and second receptacle portions of said vessel at a first predetermined reaction enabling temperature;
   means for controlling the temperature of said recombination chamber upper portion of said enclosed vessel at a second lower predetermined recombination enabling temperature.

2. The battery cell of claim 1 wherein said first reactant material is metallic sodium and wherein said sulfuryl chloride catholyte material also includes sodium tetrachloroaluminate and aluminum chloride salts.

3. The battery cell of claim 1 wherein said solid electrolyte member is comprised of beta double prime alumina.

4. The battery cell of claim 3 wherein said vessel first and second receptacle portion temperature is a temperature above two hundred degrees centigrade.

5. The battery cell of claim 4 wherein said vessel upper portion temperature is a temperature below one hundred fifty degrees centigrade.

6. The battery cell of claim 4 wherein said vessel upper portion temperature is a temperature above one hundred degrees centrigrade.

7. A method for operating a rechargeable sodium and halogen secondary electrical battery cell comprising the steps of:
   chemically reacting the sodium and halogen first pair reactant materials of said battery cell in an electrical energy generating first chemical reaction that is disposed in a first physical region of said battery cell and is generating of a second pair of reactant materials;
   chemically combining said second pair of reactant materials in an electrical energy consuming charging second chemical reaction that is also disposed in the battery cell first physical region and is reforming of said sodium and halide first pair reactant materials;
   capturing the volatile products generated during said chemically reacting and chemically combining steps;
   regenerating, in a second physical region of said battery cell and, from said volatile products at least one of the reactant materials of said first and second pair;
   returning said regenerated reactant material to said battery cell first physical region for secondary cell enabling continuing participation in said chemically reacting and chemically combining steps.

8. The method of claim 7 further including the steps of maintaining said battery cell first physical region at a first operating temperature and keeping said battery cell second physical region at a lower second operating temperature.

9. The method of claim 7 further including the steps of monitoring said battery cell first physical region at a first operating temperature and keeping said bettery cell second physical region at a higher second operating temperature.

10. The method of claim 7 further including the steps of disposing said battery cell first physical region in the lower portion of an enclosed vessel and said battery cell second physical region in the upper portion of said vessel.

11. The method of claim 10 wherein said second physical region has a volume of twenty five percent of the combination of said first and second physical regions.

12. The method of claim 8 wherein said first operating temperature is above two hundred twenty five degrees centigrade and said second operating temperature is between one hundred and one hundred seventy-five degrees centigrade.

13. The method of claim 7 wherein said sodium reactant material includes metallic sodium.

14. The method of claim 13 wherein said halide reactant material includes a sulfuryl chloride catholyte.

15. The method of claim 14 wherein said halide reactant material includes sulfuryl chloride, sodium tetrachloroaluminate and aluminum chloride.

16. The method of claim 15 wherein said sodium tetrachloroaluminate and said aluminum chloride are of one molar and one-half molar concentrations respectively.

17. The method of claim 7 wherein said capturing step includes:
collecting a first volatile product generated during said electrical energy generating first chemical reaction;
collecting a second volatile product generated during said electrical energy consuming second chemical reaction;
storing the one of said first and second volatile products that is in recombination reaction excess within a closed environment of said battery cell until subsequent additional generation of the absent volatile product enables continuation of said regenerating step.

18. The method of claim 17 wherein said battery cell is a sodium and sulfuryl chloride cell and wherein said first volatile product is sulfur dioxide gas and said second volatile product is chlorine gas.

19. A rechargeable alkali and halide electrical battery cell comprising the combination of:
an enclosed vessel;
an alkali metal inclusive anodic reactant material received in said vessel;
a halide inclusive liquid catholyte material received in said vessel;
an alkali metal ion transporting separation member disposed between said reactant materials in said vessel;
plenum chamber means in communication with said vessel for receiving volatile reaction products incident to the cell discharge reaction of said anodic reactant and catholyte materials and to the cell recharge regeneration thereof;
means communicating between said plenum chamber means and said ion transporting member region of said vessel for returning regenerated reactant materials to said vessel.

20. The battery cell of claim 19 wherein said alkali metal is sodium and said catholyte material is sulfuryl chloride.

21. The battery cell of claim 19 wherein said plenum chamber means includes an elevation separated upper portion of said vessel and wherein said means communicating includes the action of gravity in returning said regenerated materials.

22. The apparatus of claim 19 wherein said plenum chamber means includes an upper vessel portion that is maintained at a temperature at least seventy five degrees centigrade cooler than the temperature of said reactant materials.

23. The apparatus of claim 19 wherein said plenum chamber means includes a cavity maintained at a temperature greater than the temperature of said reactant materials.

24. The apparatus of claim 19 wherein said plenum chamber means includes a remotely disposed chamber and means communicating between said chamber and said vessel.

25. The apparatus of claim 19 wherein said liquid catholyte material comprises sulfuryl chloride and wherein said returned regenerated reactant material consists of said sulfuryl chloride catholyte material.

* * * * *